(12) United States Patent
Kimura et al.

(10) Patent No.: US 7,903,528 B2
(45) Date of Patent: Mar. 8, 2011

(54) OPTICAL PICK-UP APPARATUS

(75) Inventors: Tohru Kimura, Hachioji (JP); Kohei Ota, Hachioji (JP); Kiyono Ikenaka, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 540 days.

(21) Appl. No.: 11/775,007

(22) Filed: Jul. 9, 2007

(65) Prior Publication Data

US 2008/0013433 A1    Jan. 17, 2008

Related U.S. Application Data

(63) Continuation-in-part of application No. 11/695,961, filed on Apr. 3, 2007, now abandoned, which is a continuation of application No. 11/120,374, filed on May 2, 2005, now Pat. No. 7,440,381, which is a continuation of application No. 09/846,238, filed on May 2, 2001, now Pat. No. 6,898,168, application No. 11/775,007, which is a continuation-in-part of application No. 10/807,197, filed on Mar. 24, 2004.

(30) Foreign Application Priority Data

| May 12, 2000 | (JP) | 2000-139836 |
|---|---|---|
| Jun. 23, 2000 | (JP) | 2000-189466 |
| Aug. 31, 2000 | (JP) | 2000-262372 |
| Oct. 30, 2000 | (JP) | 2000-330009 |
| Dec. 25, 2000 | (JP) | 2000-392333 |
| Mar. 28, 2003 | (JP) | 2003-092523 |

(51) Int. Cl.
    *G11B 7/00*    (2006.01)
(52) U.S. Cl. ............... 369/112.01; 369/112.02
(58) Field of Classification Search ............. 369/112.01, 369/112.1, 112.02, 112.07, 44.23, 44.24, 369/275.3, 94, 112.26, 112.03, 112.04, 112.05, 369/112.23, 112.24
    See application file for complete search history.

(56) References Cited

U.S. PATENT DOCUMENTS 6,049,519 A    4/2000    Arai et al.
(Continued)

FOREIGN PATENT DOCUMENTS

DE    19924640 A1    5/1999
(Continued)

OTHER PUBLICATIONS

Notification of Office Action from the Japanese Patent Office, mailed Aug. 24, 2010, in Japanese Patent Application No. JP 2000-392333.

(Continued)

*Primary Examiner* — Nabil Z Hindi
(74) *Attorney, Agent, or Firm* — Finnegan, Henderson, Farabow, Garrett & Dunner

(57) ABSTRACT

An optical pickup apparatus for conducting recording and/or reproducing information for a first optical information recording medium including at least a transparent protective substrate, a first information recording surface, and a second information recording surface which are laminated in this order from a light source side along an optical axis, comprising:

a first light source to emit a light flux having a wavelength of $\lambda 1$ (380 nm$\leq \lambda 1 \leq$450 nm);

an objective lens to converge the light flux onto the first optical information recording medium;

a spherical aberration correcting structure to correct a spherical aberration caused in a converged spot on the first and second information recording surfaces due to a difference in thickness between the thickness to the first information recording surface and the thickness to the second information recording surface.

11 Claims, 7 Drawing Sheets

U.S. PATENT DOCUMENTS

| | | |
|---|---|---|
| 6,191,889 B1 | 2/2001 | Maruyama |
| 6,192,022 B1 | 2/2001 | Hendriks et al. |
| 6,317,276 B1 | 11/2001 | Braat |
| 6,345,034 B1 * | 2/2002 | Kim .......................... 369/275.5 |
| 6,610,380 B2 | 8/2003 | Kitaura et al. |
| 6,721,259 B1 * | 4/2004 | Yamamoto et al. ...... 369/112.26 |
| 6,771,584 B2 | 8/2004 | Yamanaka |
| 6,853,614 B2 * | 2/2005 | Kim et al. ................. 369/112.01 |
| 6,870,805 B1 * | 3/2005 | Arai et al. ................. 369/112.07 |
| 6,927,923 B2 | 8/2005 | Kimura |
| 6,950,383 B2 | 9/2005 | Kimura |
| 6,954,417 B2 | 10/2005 | Komma et al. |
| 7,002,892 B2 | 2/2006 | Kitamura et al. |
| 7,035,192 B2 * | 4/2006 | Kitaoka et al. ........... 369/112.01 |
| 7,158,450 B2 | 1/2007 | Wada et al. |
| 7,333,405 B2 * | 2/2008 | Komma et al. ............ 369/44.25 |
| 2002/0181366 A1 | 12/2002 | Katayama |

FOREIGN PATENT DOCUMENTS

| | | |
|---|---|---|
| EP | 0 517 491 A2 | 12/1992 |
| EP | 0 881 634 A1 | 12/1998 |
| EP | 0 984 440 A2 | 3/2000 |
| EP | 1 043 615 A1 | 10/2000 |
| JP | 05-182235 | 7/1993 |
| JP | 10-106012 | 4/1998 |
| JP | 2000-285500 | 10/2000 |
| WO | WO 00/23841 | 4/2000 |

OTHER PUBLICATIONS

Abstract of JP 05-182235 (Ricoh Co Ltd.).
Abstract of JP 10-106012 (Konica Corp.).
Abstract of JP 2000-285500 (Konica Corp.).

* cited by examiner

OPTICAL PICK-UP APPARATUS

This application is a continuation-in-part of U.S. patent application Ser. No. 11/695,961, filed on Apr. 3, 2007, now abandoned which is a continuation application of U.S. application Ser. No. 11/120,374, filed May 2, 2005, now U.S. Pat. No. 7,440,381 which is a continuation application of U.S. application Ser. No. 09/846,238, filed May 2, 2001, now U.S. Pat. No. 6,898,168, which claims the foreign priority benefit of Japanese Application Nos. 2000-139,836, filed May 12, 2000, 2000-189,466, filed Jun. 23, 2000, 2000-262,372, filed Aug. 31, 2000, 2000-330,009, filed Oct. 30, 2000, and 2000-392,333, filed Dec. 25, 2000. This application is also a continuation-in-part of U.S. application Ser. No. 10/807,197, filed Mar. 24, 2004, which claims the foreign priority benefit of Japanese Application No. 2003-092523, filed Mar. 28, 2003.

BACKGROUND OF THE INVENTION

The present invention relates to an optical pickup device.

There has been known an optical disc (two-layer disc) having two layers of information recording surfaces (recording layers), as a method, for example, to increase recording capacity by enhancing recording density of DVD (digital video disc).

The two-layer disc is of the structure wherein a transparent protective base board, a first information recording surface, an intermittent layer, a second information recording surface and a protective base board on the reverse side are superposed in this order from the light source in the direction of an optical axis.

In the two-layer disc, a distance (thickness) from the surface of the transparent protective base board to the second recording layer is thicker than that from the surface of the transparent protective base board to the first recording layer by an amount of the intermittent layer, owing to the aforementioned structure. Therefore, spherical aberration caused by this thickness difference arises on each information recording surface.

However, in the case of DVD wherein a numerical aperture of an objective lens closer to an image is as relatively small as 0.6, it is possible to conduct recording and reproducing of information without correcting spherical aberration, because the spherical aberration stated above is in a range where there are no difficulties in practical use.

Incidentally, in recent years, there have been advanced research and development of the so-called high density optical disc wherein recording density has been enhanced by employing a blue laser beam having a wavelength of about 400 nm, by making a numerical aperture (NA) of an objective lens closer to an image to be about 0.85 and by making a protective base board thickness of an optical disc to be 0.1 mm, and further, there has been advanced development of a technology to make such high density optical disc to be of the two-layer structure.

Then, in the high density optical disc having the two-layer structure, it is required to correct spherical aberration caused by a difference between the thickness from the surface of a transparent protective base board to a first information recording layer and the thickness from the surface of a transparent protective base board to a second information recording layer.

SUMMARY OF THE INVENTION

Taking the aforementioned problems into consideration, an object of the invention is to provide an optical pickup device that is used for conducting recording and/reproducing of information for a high density optical disc having two information recording surfaces.

The above object can be attained by an optical pickup apparatus having the following structures made based on one aspect of the present invention.

An optical pickup apparatus for conducting recording and/or reproducing information for a first optical information recording medium including at least a transparent protective substrate, a first information recording surface, and a second information recording surface which are laminated in this order from a light source side along an optical axis, comprises:

a first light source to emit a light flux having a wavelength of $\lambda 1$ (380 nm $\leqq \lambda 1 \leqq$ 450 nm);

an objective lens to converge the light flux onto the first optical information recording medium;

a spherical aberration correcting structure to correct a spherical aberration caused in a converged spot on the first and second information recording surfaces due to a difference in thickness between the thickness from the surface of the transparent protective substrate to the first information recording surface and the thickness from the surface of the transparent protective substrate to the second information recording surface when the objective lens converges a light flux emitted from the first light source on the first information recording surface and the second information recording surface.

DETAILED DESCRIPTION OF THE PREFERRED EMBODIMENT

Figure 1:
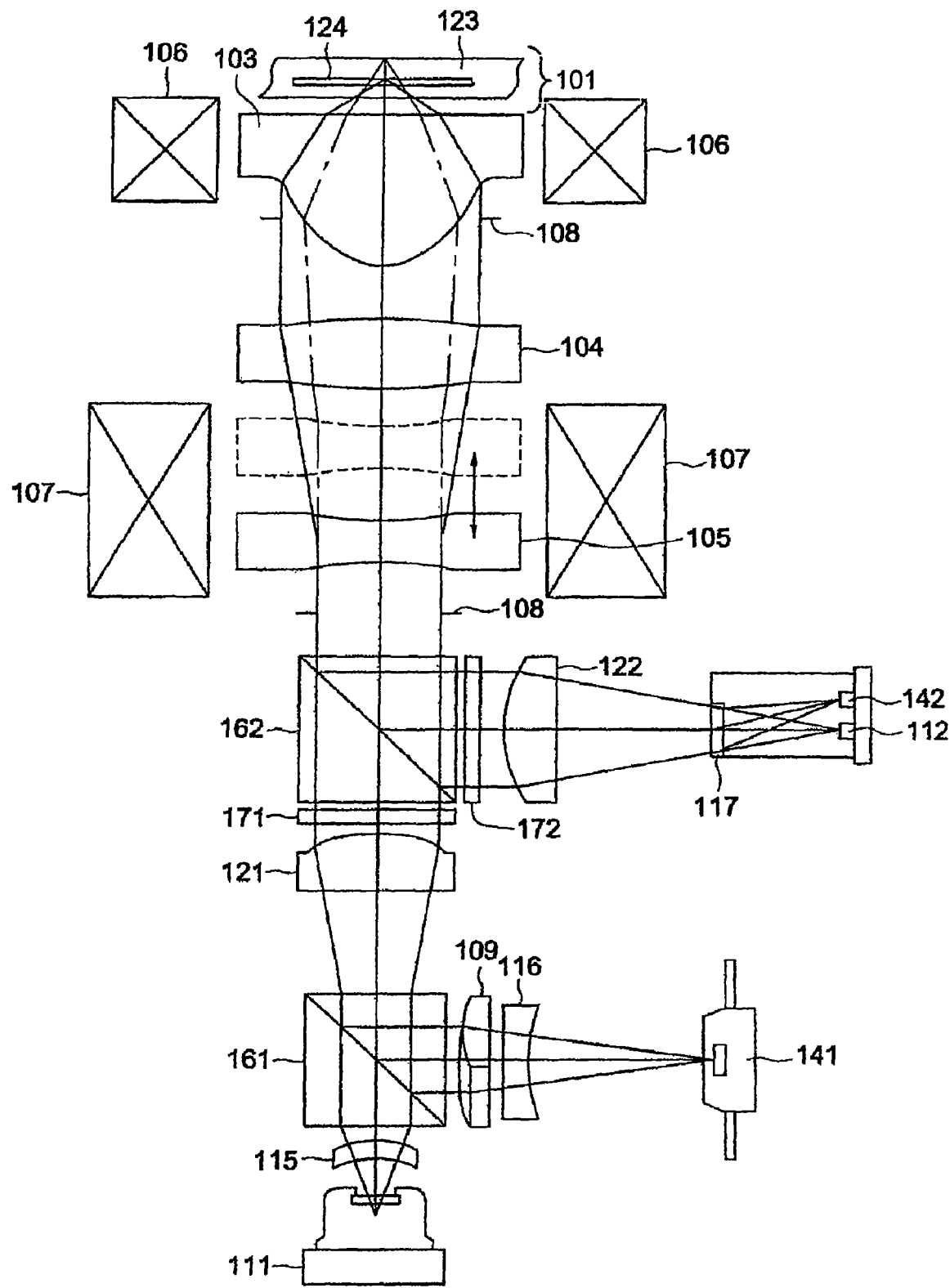
FIG. 1 is an outline structural view of an optical pick-up apparatus in a first embodiment according to the present embodiment.

Hereinafter, preferred embodiments according to the present invention will be explained. However, the present invention is not limited to these embodiments.

Firstly, the preferable structures of an optical pickup apparatus capable of attaining the above object will be explained.

Item 1. An optical pickup apparatus for conducting recording and/or reproducing information for a first optical information recording medium including at least a transparent protective substrate, a first information recording surface, and a second information recording surface which are laminated in this order from a light source side along an optical axis, comprises:

a first light source to emit a light flux having a wavelength of λ1 (380 nm≦λ1≦450 nm);

an objective lens to converge the light flux onto the first optical information recording medium;

a spherical aberration correcting structure to correct a spherical aberration caused in a converged spot on the first and second information recording surfaces due to a difference in thickness between the thickness from the surface of the transparent protective substrate to the first information recording surface and the thickness from the surface of the transparent protective substrate to the second information recording surface when the objective lens converges a light flux emitted from the first light source on the first information surface and the second information recording surface.

Item 2. In the optical pickup apparatus described in Item 1, the thickness of the transparent protective substrate t1 is 0.2 mm or less (t1≦0.2 mm).

Item 3. In the optical pickup apparatus described in Item 1, the spherical aberration correcting structure includes at least a negative lens and a positive lens, and at least one of the negative lens and the positive lens is made movable in the optical axis direction.

Item 4. In the optical pickup apparatus described in Item 1, the spherical aberration correcting structure includes a liquid crystal element.

Item 5. An optical pickup apparatus can be used for conducting recording and/or reproducing of information for the first optical information recording medium having at least t1 (0.5 mm≦t1≦0.7 mm)-thick transparent protective base board, a first information recording surface, an intermittent layer and a second information recording surface which are laminated in this order from the part of a light source in the direction of an optical axis, and the optical pickup apparatus is provided with a spherical aberration correcting mechanism that corrects spherical aberration caused by a thickness of the intermittent layer on a light-converged spot on each information recording surface when a light flux having at least wavelength λ1 (380 nm≦λ1≦450 nm) is converged on the first information recording surface and the second information recording surface.

The structure described in Item 5 makes it possible to correct spherical aberration caused on a light-converged spot on each information recording surface by a thickness of the intermittent layer by using a light flux with wavelength λ1 (380 nm≦λ1≦450 nm), even for a first optical information recording medium (two-layer structured AOD) having at least t1 (0.5 mm≦t1≦0.7 mm)-thick transparent protective base board, a first information recording surface, an intermittent layer and a second information recording surface.

Item 6. In the optical pickup device described in Item 5, when the light flux with wavelength λ1 is converged on one of the first and second information recording surfaces after the light flux with wavelength λ1 has been converged on the other of the first and second information recording surfaces, the spherical aberration correcting mechanism stated above changes an angle of incidence of the light flux with wavelength λ1 on the objective lens.

In the structure described in Item 6, the same effects as those in Item 5 are obtained, and when the light flux with wavelength λ1 is converged on the first information recording surface without aberrations substantially, for example, spherical aberration resulting from a thickness of the intermittent layer interposing between the first information recording surface and the second information recording surface is caused on the second information recording surface. Under such condition, when the light flux with wavelength λ1 is converged on the second information recording surface without aberrations substantially, it is possible to correct the spherical aberration on the second information recording surface to the level where there are no difficulties in practical use, by changing an angle of incidence of the light flux with wavelength λ1 on the objective lens.

Since these changes of an angle of incidence of the light flux with wavelength λ1 on the objective lens can be realized by moving optical elements such as a light source and a coupling lens, for example, constituting the optical pickup device, in the direction of the optical axis, a mechanism for moving these light source and the optical element has only to be added newly to the structure of the conventional optical pickup device, which can control manufacturing cost of optical pickup devices.

Item 7. In the optical pickup device described in Item 5, the spherical aberration correcting mechanism stated above moves an optical element arranged in an optical path of the light flux with wavelength λ1, the aforementioned light source or that optical element and the light source, in the direction of the optical axis.

In the structure described in Item 5, the same effects as those in Item 5 are obtained, and the spherical aberration correcting mechanism stated above moves an optical element arranged in an optical path of the light flux with wavelength λ1, the aforementioned light source or that optical element and the light source, in the direction of the optical axis. The optical element arranged in the optical path of the light flux with wavelength λ1 means an optical element having a function to make an incident light flux to emerge after changing its angle of emergence, such as a collimator lens, a coupling lens and a beam expander into which a divergent light flux enters respectively. Therefore, it is possible to correct spherical aberration caused by a thickness of the intermittent layer on a light-converged spot on each information recording surface, by moving these optical elements and light source in the direction of the optical axis, and thereby, by changing an angle of incidence of the light flux with wavelength λ1 on the objective lens.

Item 8. In the optical pickup device described in Item 5, the wave-front aberration correcting mechanism stated above is provided with liquid crystal elements arranged in an optical path of the light quid flux with wavelength λ1 and controls refractive index distribution of the liquid crystal elements.

In the structure described in Item 8, the same effects as those in Item 5 are obtained, and an area of liquid crystal elements through which light fluxes with wavelength λ1 pass is divided into plural ring-shaped zonal areas whose centers are on the optical axis, and refractive index of each area is changed, thereby, the refractive index distribution in the area can be changed on a multi-step basis, and accuracy for correction of spherical aberration can be improved. Incidentally, it may be preferable that the liquid crystal element is divided into a plurality of areas depending on phase difference and the number of areas is from 3 to 6, and that a phase difference Φ between neighboring areas among the plurality of areas satisfies the following formula:

$$2\pi \times 0.04 \leq |\Phi| \leq 2\pi \times 0.12.$$

Item 9. In the optical pickup device described in Item 5, there is provided an optical element made of plastic that is arranged in an optical path for the light flux with wavelength λ1, and the wave-front aberration correcting mechanism stated above changes characteristics of the optical element by giving temperature changes to the optical element.

In the structure described in Item 9, the same effects as those in Item 5 are obtained, and changes in forms have a great influence on changes of refractive indexes, because changes of refractive indexes caused by temperature changes of plastic are great. Therefore, the direction of the light flux with wavelength $\lambda 1$ entering the optical element is changed, and as a result, an angle of incidence of the light flux with wavelength $\lambda 1$ entering the objective lens is changed, and thus, spherical aberration can be corrected.

Item 10. In the optical pickup device described in Item 5 or Item 7, the wave-front aberration correcting mechanism stated above corrects the spherical aberration mentioned above caused by individual differences of the light source.

In the structure described in Item 10, the same effects as those in Item 5 or Item 7 are obtained, and the spherical aberration mentioned above caused by individual differences of the light source can be corrected. As a correcting method, there is given a method wherein optical elements and a light source arranged in an optical path for the light flux with wavelength $\lambda 1$ are moved by the spherical aberration correcting mechanism in the direction of the optical axis. In particular, in the case of high density optical disc such as AOD, an influence by deviation of an oscillation wavelength caused by individual differences of the light source is great because a wavelength of a light flux is shorter than that for DVD or CD, therefore, it is important that the optical pickup device has a function to correct spherical aberration resulting from individual differences of the light source.

Item 11. In the optical pickup device described in Item 5, an optical element which does not operate during operation of the optical pickup device among optical elements arranged in the optical path for the light flux with wavelength $\lambda 1$, the aforementioned light source or that optical element and the light source are moved in the direction of the optical axis in the course of manufacturing optical pickup devices, for correcting spherical aberration caused on a light-converged spot on each information recording surface by deviation of an oscillation wavelength from the design wavelength resulting from individual differences of the light source.

In the structure described in Item 11, the same effects as those in Item 5 are obtained, and an optical element which does not operate during operation of the optical pickup device among optical elements arranged in the optical path for the light flux with wavelength $\lambda 1$, the light source or that optical element and the light source are moved by a worker in the direction of the optical axis in the course of manufacturing optical pickup devices, to correct the spherical aberration.

In this case, the optical element arranged in the optical path of the light flux with wavelength $\lambda 1$ means an optical element having a function to make an incident light flux to emerge after changing its angle of emergence, such as a collimator lens, a coupling lens and a beam expander. Therefore, it is possible to correct spherical aberration by moving these optical elements and light source in the direction of the optical axis, and thereby, by changing an angle of incidence of the light flux with wavelength $\lambda 1$ on the objective lens.

When using a high density optical disc such as AOD, it is especially important that the optical pickup device has a function to correct spherical aberration resulting from individual differences of the light source.

Item 12. In the optical pickup device described in either one of Items 5-11, a light flux with wavelength $\lambda 2$ (650 nm$\leq \lambda 2 \leq$700 nm) is used to conduct recording and/or reproducing of information for the second optical information recording medium having a t2 (0.5 mm$\leq$t2$\leq$0.7 mm)-thick transparent protective base board.

In the structure described in Item 12, the same effects as those in either one of Items 5-11 are obtained, and it is possible to obtain an optical pickup device which can conduct recording and/or reproducing of information for DVD, for example, as the second optical information recording medium and has compatibility.

Item 13. In the optical pickup device described in either one of Items 5-12, a light flux with wavelength $\lambda 3$ (750 nm$\leq \lambda 3 \leq$850 nm) is used to conduct recording and/or reproducing of information for the third optical information recording medium having a t3 (1.1 mm$\leq$t3$\leq$1.3 mm)-thick transparent protective base board.

In the structure described in Item 13, the same effects as those in either one of Items 5-12 are obtained, and it is possible to obtain an optical pickup device which can conduct recording and/or reproducing of information for CD, for example, as the third optical information recording medium and has compatibility.

Item 14. In the optical pickup device described in either one of Items 5-13 wherein, focal length f of the objective lens for the light flux having wavelength $\lambda 1$ satisfies 2.0 mm$\leq$f$\leq$4.0 mm.

In the structure described in Item 14, the same effects as those in either one of Items 5-13 are obtained, and it is possible to secure a sufficient working distance and to miniaturize an optical pickup device.

First Embodiment

FIG. 1 is an outline structural view of the optical pick-up apparatus according to the first embodiment. In FIG. 1, the first light source 111 to conduct the recording and/or reproducing for the first optical information recording medium 124, and the second light source 112 whose wavelength is different from the first light source 111 to conduct the recording and/or reproducing for the second optical information recording medium 123 are provided, and coupling lenses 121 and 122 to convert the divergent angles of the divergent light fluxes emitted from respective light sources, a beam splitter 162 which is an optical path composition means for making the light fluxes emitted from respective light sources advance in almost the same direction, an objective lens 103 to light-converge the light flux from the beam splitter 162 onto the information recording plane 101 of the optical information recording medium, and light detectors 141 and 142 to light-receive the reflected light from the optical information recording medium, are provided. In the drawing, numeral 108 is a diaphragm, numeral 109 is a cylindrical lens, numerals 171 and 172 are ¼ wavelength plates, numeral 115 is a coupling lens to reduce the divergent angle of the divergent light flux from the light source 111, numeral 116 is a concave lens, and numeral 117 is a hologram to separate the reflected light flux.

Further, in the present embodiment, as a means for correcting the variation of the spherical aberration of the objective lens 103 and a divergent angle changing means, a negative lens 105 and a positive lens 104 which are arranged in order from the light source side and an actuator 107 are provided, (hereinafter, these are also called a spherical aberration correction means, and a divergent angle changing means). The actuator 107 functions as a transfer apparatus to change the slope angle of the marginal ray of the light flux by moving the negative lens 105 as an optical element in the optical axis direction. Further, relating to the present embodiment, an example of so-called beam expander structured by the transferable negative lens 105 and the positive lens 104, is sometimes expressed as the spherical aberration correction means. In this connection, numeral 106 is an actuator to drive the objective lens 103 in the optical axis direction for focusing. It is defined that the first light source 111 can emit the laser light of wavelength λ1=405 nm, and the second light source 112 can emit the laser light of wavelength λ2=655 nm.

Now, the first embodiment will be explained. As described above, so-called 2 layer recording system optical information recording medium is well known in which, by providing two phase change layers of the first information recording layer and the second information recording layer on the one side of the optical information recording medium, and by recording the information on each of them, the storage capacity of the optical information recording medium is increased to about 2 times. The optical pickup apparatus shown in FIG. 1 can also be applied for recording or reproducing of the information for such the 2 layer recording system optical information recording medium, and the spherical aberration generated by the difference in the thickness between the incident plane of the light flux and the information recording plane of each information recording layer can be corrected.

Figure 2:
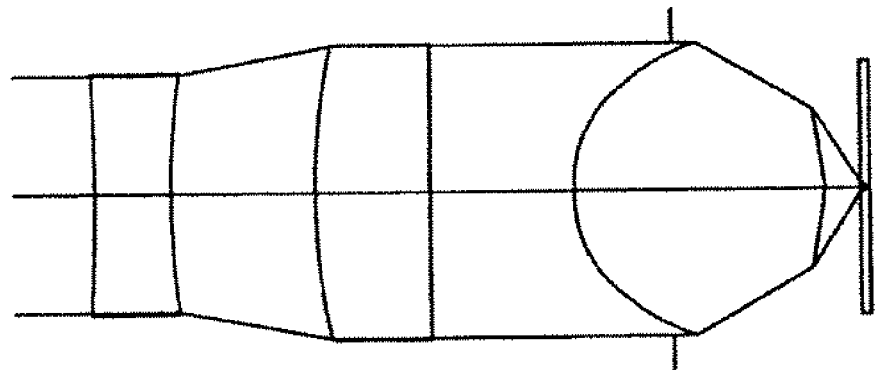
FIG. 2 is an optical system structural view showing a spherical aberration correcting mechanism structured with a negative lens 5 and a positive lens 4 and objective lens 3 in the first embodiment.

FIG. 2 is an optical system structural view in the first embodiment including the negative lens 105, positive lens 104, and objective lens 103, and Table 1 indicates lens data of this optical system. In this embodiment, the information is recorded or reproduced by the combination of the first light source 111 of the wavelength 405 nm and the objective lens 103 having the image side numerical aperture NA 0.85.

Incidentally, in this embodiment employing a short wavelength light source in which oscillating wavelength is 500 nm or less and a high NA objective lens having NA of 0.6 or more, in order to suppress coma aberration as small as possible, the thickness of a transparent protective substrate of the optical information medium is preferably 0.2 mm or less.

TABLE 1

| | | r (mm) | d (mm) | $N_{\lambda 1}$ | vd |
|---|---|---|---|---|---|
| λ1 405 nm NA 0.85 | | | | | |
| 1 (Aspheric surface 1) | Spherical aberration | −17.882 | 0.800 | 1.66845 | 24.3 |
| 2 (Aspheric surface 2) | correction means | 7.461 | 1.500 | | |
| 3 (Diffractive surface 1) | | 7.218 | 1.200 | 1.52491 | 56.5 |
| 4 (Diffractive surface 2) | | ∞ | 2.500 | | |
| 5 (Diaphragm) | | ∞ | −1.000 | | |
| 6 (Aspheric surface 3) | Objective lens | 1.194 | 2.650 | 1.52491 | 56.5 |
| 7 (Aspheric surface 4) | | −0.975 | 0.355 | | |
| 8 | Transparent substrate | ∞ | 0.100 | 1.61949 | 30.0 |
| 9 | | ∞ | 0.000 | | |

Aspheric surface coefficient
Aspheric surface 1

| K | −180.985319 |
|---|---|
| $A_4$ | 0.213341E−02 |
| $A_6$ | −0.309153E−03 |
| $A_8$ | −0.923446E−03 |
| $A_{10}$ | 0.434595E−03 |

Aspheric surface 2

| K | 6.460482 |
|---|---|
| $A_4$ | 0.303589E−02 |
| $A_6$ | −0.127523E−02 |
| $A_8$ | −0.661011E−03 |
| $A_{10}$ | 0.354629E−03 |

TABLE 1-continued

Aspheric surface 3

| K | −0.683354 |
|---|---|
| $A_4$ | 0.162029E−01 |
| $A_6$ | 0.154908E−02 |
| $A_8$ | 0.289288E−02 |
| $A_{10}$ | −0.367711E−03 |
| $A_{12}$ | −0.358222E−03 |
| $A_{14}$ | 0.148419E−03 |
| $A_{16}$ | 0.119603E−03 |
| $A_{18}$ | −0.302302E−04 |
| $A_{20}$ | −0.110520E−04 |

Aspheric surface 4

| K | −21.704418 |
|---|---|
| $A_4$ | 0.308021 |
| $A_6$ | −0.639499 |
| $A_8$ | 0.585364 |
| $A_{10}$ | −0.215623 |
| $A_{12}$ | −0.252265E−03 |

Diffractive surface coefficient
Diffractive surface 1

| $b_2$ | −6.7880E−03 |
|---|---|
| $b_4$ | −1.2066E−04 |

Diffractive surface 2

| $b_2$ | −9.7794E−03 |
|---|---|
| $b_4$ | 5.1838E−04 |

Figure 3:
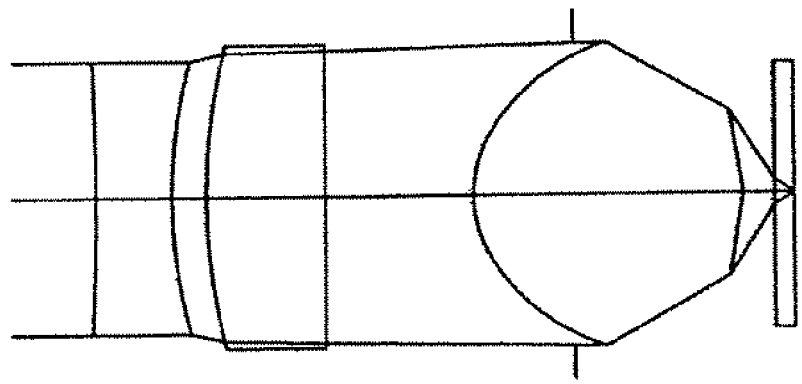
FIG. 3 is a schematic drawing showing an operation of the spherical aberration correcting mechanism.

In the first embodiment, for example, when, in the order from the incident plane of the light flux of the optical information recording medium, the first information recording layer and the second information recording layer are defined, as shown in FIG. 3, by reducing the interval between the negative lens 105 and the positive lens 104 as the spherical aberration correction means, the recording or reproducing of the information can conducted onto the information recording plane of the second information recording layer.

Figure 4:
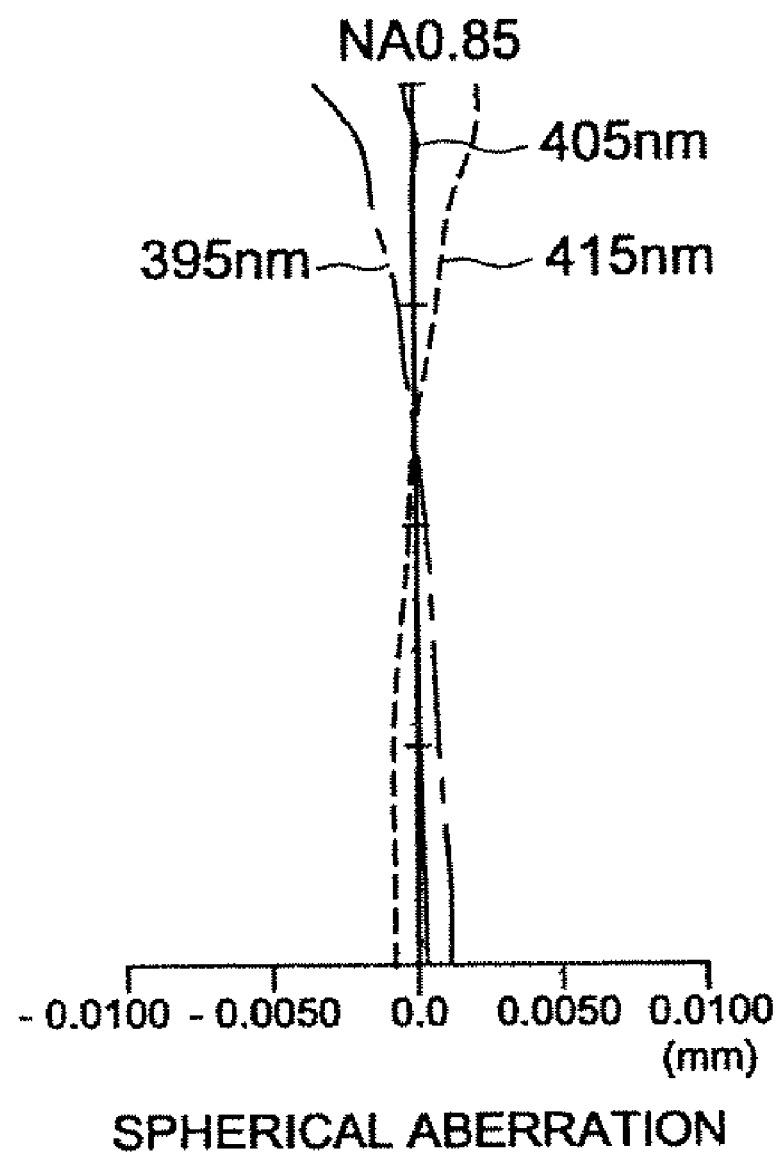
FIG. 4 is a spherical aberration view of the objective lens 3 in the first embodiment.

Incidentally, in the present embodiment, when the diffractive surfaces are added to the both surfaces of the positive lens 104, and the diffractive structure has characteristics in which the back focus becomes short on the long wavelength side, the axial chromatic aberration generated in the objective lens 103 is corrected. In this case, when the axial chromatic aberration of the composite system in which the objective lens 103, and the negative lens 105 and the positive lens 104 as the spherical aberration correction means are combined, is made in the overcorrected condition, as shown in FIG. 4, a spherical aberration curve of the oscillation wavelength (405 nm) of the first light source 111 and a spherical aberration curve on the long and short wavelength are made to cross each other. Thereby, when the mode hopping of the light source occurs, deterioration of the wave front aberration at the time of high frequency superimposition is very small, and for example, even when the oscillation wavelength of the light source is minutely varied, the shift of the position of the best image plane can be suppressed to small. Further, when the negative lens 105 which is the movable element as the spherical aberration correction means, is formed into the both side aspheric surface lens, the deterioration of the wave front aberration at the time of the decentering of the negative lens 105 or the tracking error is suppressed to small. Further, as the material of the negative lens 105 and the positive lens 104, by respectively selecting the materials of vdN=24.3 and vdP=56.5, the axial chromatic aberration in the objective lens 103 is corrected, and the burden of the diffractive structure added to the positive lens 104 is lightened. Further, in the present example, fN=−7.78 (mm), fP=9.95 (mm), and f1=1.765 (mm).

In this embodiment, because the diaphragm to regulate the light flux is arranged on the optical information recording medium side from the top of the surface of the light source side of the objective lens 103, when the divergent light flux is incident, the light ray passing height of the surface on the most light source side of the objective lens 103 can be suppressed to small. This is preferable also for the size reduction or aberration correction of the objective lens 103.

Further, in this embodiment, the correction of the variation of the spherical aberration at the time of the wavelength variation of the light source or temperature change can be conducted as follows.

When the wavelength becomes large, or the temperature rises, in the objective lens 103, the overcorrected spherical aberration is generated. In such the case, when the negative lens 105 is moved along the optical axis by the actuator 107, and the interval between the negative lens 105 and the positive lens 104 is reduced, the undercorrected spherical aberration can be generated. When the negative lens 105 is moved by an appropriate amount, the overcorrected spherical aberration can be cancelled, and as can clearly be seen from Table 2 showing the result of the spherical aberration, the spherical aberration of the whole optical system becomes fine.

TABLE 2

| Image height characteristic WFE rms | | $Y = 0$ μm $Y = 10$ μm | $0.004\lambda$ (1.50 mm) $0.011\lambda$ |
|---|---|---|---|
| Wavelength characteristic WFE rms | +10 nm −10 nm | $Y = 0$ μm $\Delta f_B$ (μm) $Y = 0$ μm $\Delta f_B$ (μm) | $0.004\lambda$ (1.29 mm) −0.94 $0.010\lambda$ (1.72 mm) +0.82 |
| Temperature characteristic WFE rms | +30° C. −30° C. | $Y = 0$ μm | $0.013\lambda$ (1.26 mm) $0.023\lambda$ (1.76 mm) |

Note)
The figure in the parentheses in the Table expresses the interval between the negative lens and the positive lens of the spherical aberration correction means, and the divergent angle changing means.

Further, when the plastic material is used for the objective lens 103, negative lens 105 and positive lens 104, the weight reduction of the optical system and the reduction of the burden onto the movable mechanism are intended. Further, because the plastic material whose internal transmitance is high for the short wavelength light, is used, the large amount of lenses can be produced at low cost, and the optical system having the high efficiency of utilization of light is realized. In this connection, the movable mechanism is the transfer apparatus of the negative lens 105 and the focusing mechanism of the objective lens 103 in the example in the present specification.

In this connection, in the present example, although not shown in FIG. 2, as shown in the embodiment in FIG. 1, in the practical optical pick-up apparatus, a coupling lens such as a collimator is provided between the light source and the spherical aberration correction means. In this case, also the axial chromatic aberration generated in the coupling lens can be corrected by the structure of the present example, and the converging optical system having the fine chromatic aberration can be obtained.

In this connection, in the present example, the negative lens 105 in the spherical aberration correction means is made transferable, however, the positive lens 104 may be made transferable, further, also when both lenses are made transferable, in the same manner, the variation of the spherical aberration of the converging optical system can be corrected. Further, in the present example, although the axial chromatic aberration of the converging optical system and the spherical aberration correction means is corrected by the diffractive structure provided on the positive lens 104 in the spherical aberration correction means, the diffractive structure may also be provided on the surface of the other lens, or other than this, the optical element having the surface provided with the diffractive structure may be separately added to the system.

In each of examples described above, as the spherical aberration correction means, the beam expander is used, and as the beam expander, although an example in which it is structured by a transferable negative single lens and a positive single lens, is shown, of course, the expander is not limited to that, but it may be a structure composed of 2 lens group or more lens groups, composed of a plurality of lenses, and so long as it does not depart from the sprit of the present invention, various modifications are possible.

Figure 5:
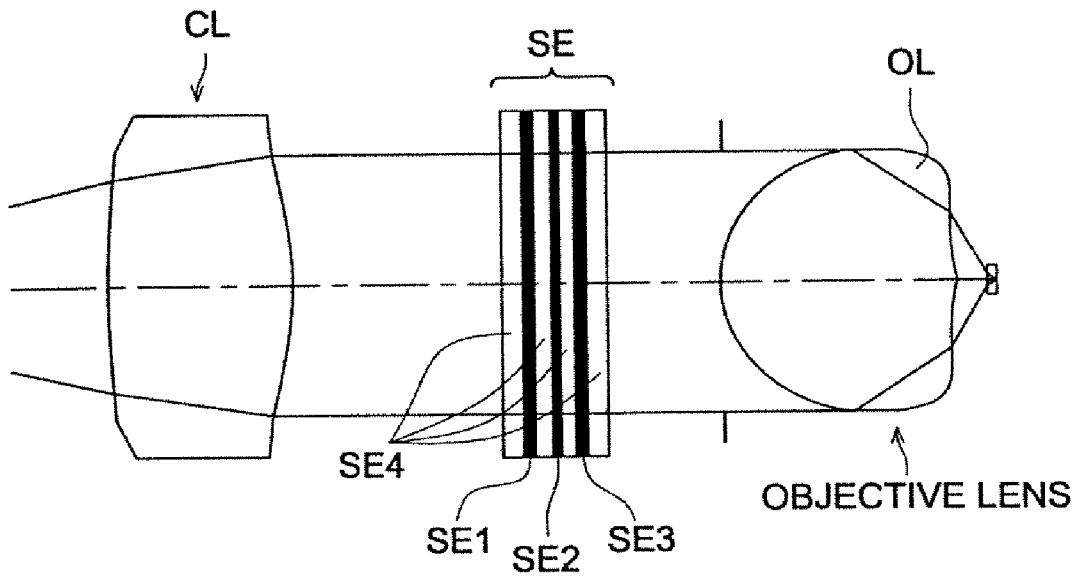
FIG. 5 is a view showing the optical system in a different example.

FIG. 5 is a view showing the optical system according to the different embodiment. An element SE for correcting the variation of the spherical aberration is inserted. Such the optical system can be used in place of the negative lens 105, positive lens 104, and the objective lens 103 in FIG. 1.

The element SE is structured such that the X direction liquid crystal element SE1, ½ wavelength plate SE2, and Y direction liquid crystal element SE3 are respectively sandwiched among 4 glass plates SE4 from the coupling lens CL side. By electrically driving both liquid crystal elements SE1 and SE2, the variation of the spherical aberration can be corrected. Further, when the ring-shaped diffractive structure (not shown) is provided on the surface of the objective lens in the coupling lens CL, the chromatic aberration of the opposite phase to the axial chromatic aberration generated in the objective lens OL, that is, the axial chromatic aberration which is excessively corrected (over) on the short wavelength side, and the axial chromatic aberration which is insufficiently corrected (under) on the long wavelength side, can be generated. As the result, because the axial chromatic aberration is canceled, the wave front when the focus is formed on the optical information recording medium (not shown) through the element SE for correcting the variation of the spherical aberration and the objective lens OL, becomes the condition in which the axial chromatic aberration is suppressed to small.

Figure 6:
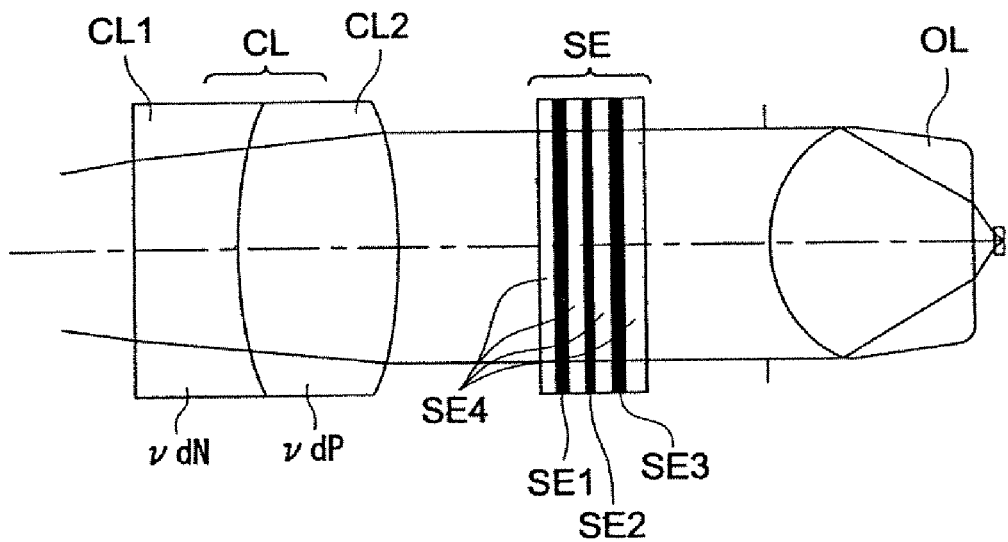
FIG. 6 is a view showing the optical system a modified example.

FIG. 6 is a view showing the optical system according to the modification of the present embodiment. In FIG. 5, because the objective lens OL and the element SE for correcting the variation of the spherical aberration are the same as in the embodiment shown in FIG. 5, the explanation is omitted. In FIG. 6, the coupling lens CL has the composition in which the negative lens CL1 and the positive lens CL2 are cemented together, and Abbe's number vdN of the negative lens CL1 and Abbe's number vdP of the positive lens CL2 have the relationship of vdN<vdP.

As described above, when Abbe's numbers of the negative lens CL1 and the positive lens CL2 are selected appropriately, the coupling lens CL generates the axial chromatic aberration having the opposite sign to that of the axial chromatic aberration generated by the objective lens OL, that is, the overcorrected axial chromatic aberration as the wavelength decreases, and the undercorrected axial chromatic aberration as the wavelength increases, can be generated. As the result, because the axial chromatic aberration is canceled, the wave front when the focus is formed on the optical information recording medium (not shown) through the coupling lens CL1 the element SE for correcting the variation of the spherical aberration and the objective lens OL, becomes the condition in which the axial chromatic aberration is suppressed to small.

Second Embodiment

The second embodiment of the optical pickup device of the invention will be explained as follows, referring to the drawings.

Figure 7:
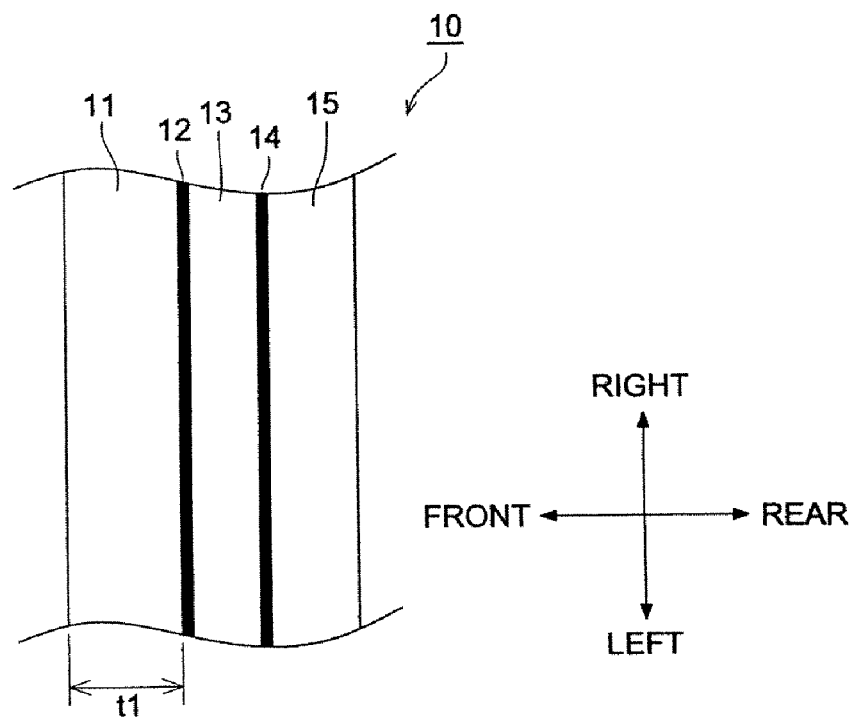
FIG. 7 is a sectional view showing the structure of AOD.

FIG. 7 is a sectional view of AOD representing first optical information recording medium 10.

The first optical information recording medium 10 is the so-called two-layer disc which is of the structure wherein transparent protective base board 11, first information recording surface 12, intermittent layer 13, second information recording surface 14 and protective base board 15 on the rear side are laminated in this order from the light source side in the optical axis direction (from the front to the rear).

Both of the transparent protective base board 11 and the intermittent layer 13 are made of transparent material through which a light flux can pass, and thickness t1 (distance in the optical axis direction) of the transparent protective base board 11 is about 0.6 mm, while, a thickness of the intermittent layer 13 is about 40 μm. Incidentally, the thickness t1 of the transparent protective base board 11 has only to be in a range of 0.5 mm-0.7 mm, and the thickness of the intermittent layer 13 is not restricted in particular.

Figure 8:
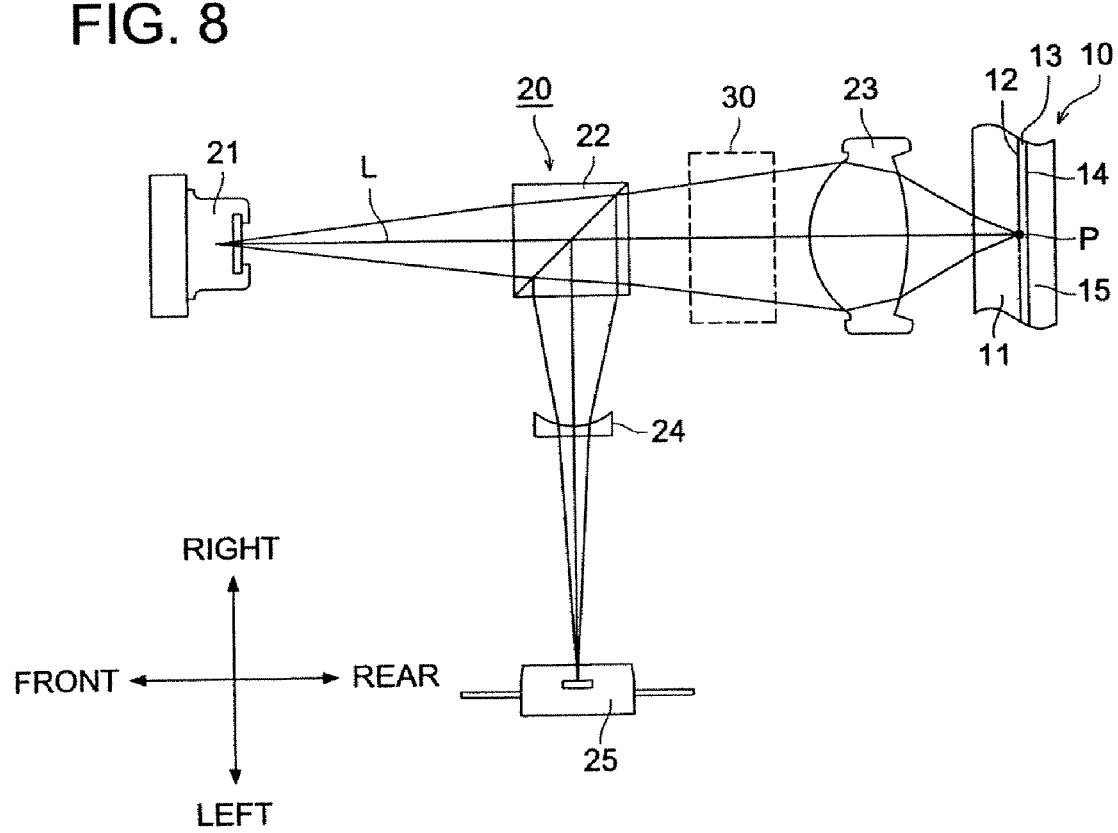
FIG. 8 is a top view showing the structure of an optical pickup device in the second embodiment.

As shown in FIG. 8, optical pickup device 20 is composed schematically of a semiconductor laser representing light source 21, beam splitter 22 that transmits a light flux with wavelength $\lambda1$ (350 nm$\leq\lambda\leq$450 nm) emitted from the semiconductor laser and branches the light flux reflected on the first optical information recording medium 10, objective lens 23 that forms a light-converged spot on each information recording surface by converging a light flux with wavelength $\lambda1$ on each of the first information recording surface 12 and the second information recording surface 14, a two-dimensional actuator (not shown) that moves the objective lens in the prescribed direction, concave lens 24, photodetector 25 that detects reflected light coming from an optical information recording medium and spherical aberration correcting mechanism 30 that corrects spherical aberration caused on the light-converged spot by a thickness of the intermittent layer 13 of the first optical information recording medium 10.

Incidentally, the spherical aberration correcting mechanism 30 in FIG. 8 is shown only conceptually, and it does not limit the position of the optical pickup device 20 in the structure. Further, FIG. 8 shows only an ordinary structure of the optical pickup device 20, and an optical element having a function to change an angle of divergence of an incident light flux for emission such as, for example, a collimator lens, a coupling lens and a beam expander, may also be arranged, in case of need.

Further, image-side numerical aperture (NA) of the objective lens 23 is 0.65.

Though the present embodiment has the structure of the so-called finite system wherein a light flux emitted from light source 21 enters the objective lens 23 as a divergent light, it is also possible to employ the structure of the infinite system wherein a collimator lens is arranged so that parallel light may enter the objective lens 23.

With regard to operations of the optical pickup device 20, a light flux with wavelength $\lambda1$ emitted from the light source 21 passes through beam splitter 22 and arrives at a plane of incidence of the objective lens 23 where the light flux is subjected to refraction actions and to diffraction actions, in case of need, to emerge from the objective lens 23, and is converged on the first information recording surface 12 or the second information recording surface 14 of the first optical information recording medium 10, thus, light-converged spot P is formed on optical axis L.

The light flux with wavelength $\lambda1$ is subjected to actions for modulating its wave front by spherical aberration correcting mechanism 30 in an optical path covering from the light source 21 to each information recording surface, though detailed explanation will be given later. Owing to this, the light flux with wavelength $\lambda1$ forms a light-converged spot under the condition that aberrations are substantially zero on each information recording surface, namely that spherical aberration is corrected to the level where there are no difficulties in practical use.

Next, the light flux with wavelength $\lambda1$ is reflected on each information recording surface, then, passes through the objective lens 23 again and is reflected on the beam splitter 22 to be branched.

Then, the branched light flux enters photodetector 25 through concave lens 24, then, the photodetector 25 detects a spot of the incident light and outputs signals which are used to obtain signals for reading information recorded on an optical information recording medium.

Further, changes in an amount of light caused by changes in a form and position of the light-converged spot on the photodetector 25 are detected to conduct detection of focusing and tracking. Based on the results of the detection, the objective lens 23 is moved by the two-dimensional actuator in the focusing direction and the tracking direction.

The spherical aberration correcting mechanism 30 will be explained next.

In the present embodiment, the spherical aberration correcting mechanism 30 has therein a driving apparatus (not shown) that moves light source 21 in the direction of optical axis L.

The structure of the driving apparatus is not restricted in particular, and a well-known actuator capable of moving the light source 21 straight such as, for example, a linear motor or a rotary motor is used.

For example, under the condition that the light flux with wavelength $\lambda1$ is converged on the first information recording surface 12 without having no aberration substantially, spherical aberration resulting from a thickness of the intermittent layer 13 interposing between the first information recording surface 12 and the second information recording surface 14 is caused on the second information recording surface 14.

When converging the light flux with wavelength $\lambda1$ on the second information recording surface 14, the spherical aberration correcting mechanism 30 controls driving of the driving apparatus to move light source 21 toward the front (the direction to become more distant from the first optical information recording medium 10) by a prescribed amount. By moving the light source 21 forward by a prescribed amount as mentioned above, an angle of incidence of the light flux with wavelength $\lambda1$ on the objective lens 23 is changed, and the light flux with wavelength $\lambda1$ can be converged on the second information recording surface 14.

When the light source 21 is moved backward and forward by the spherical aberration correcting mechanism 30 as mentioned above, spherical aberration of the light-converged spot on the image recording surface on the side where reproducing and/or recording of information is conducted can be corrected to the level where there are no difficulties in practical use.

Incidentally, in the present embodiment, an angle of incidence of the light flux with wavelength $\lambda1$ on the objective lens 23 is changed when the light source 21 is moved backward and forward by the spherical aberration correcting mechanism 30. However, without being limited to the foregoing, it is also possible to change an angle of incidence of the light flux with wavelength $\lambda1$ on the objective lens 23 by arranging an optical element (collimator or coupling lens)

that changes an angle of divergence of an incident light flux and makes it to emerge in the optical path of the light flux with wavelength λ1, and thereby by moving the optical element backward and forward.

Further, in the present embodiment, recording and/or reproducing of information is conducted for a two-layered high density disc having transparent protective base board 11 with thickness t1 of 0.6 mm by using a light flux with wavelength λ1. In addition to this, it is also possible to arrange, by adding a structure to the foregoing, so that recording and/or reproducing of information can also be conducted for the second optical information recording medium (for example, DVD) having a transparent protective base board with thickness t2 (0.5 mm≦t2≦0.7 mm) by using a light flux with wavelength λ2 (650 nm≦λ2≦700 nm), or it is also possible to arrange, by adding a structure to the foregoing, so that recording and/or reproducing of information can further be conducted for the third optical information recording medium (for example, CD) having a transparent protective base board with thickness t3 (1.1 mm≦t3≦1.3 mm) by using a light flux with wavelength λ3 (750 nm≦λ3≦850 nm). In this case, either one of the second optical information recording medium and the third optical information recording medium, or both of them may be made to be of a two-layer structure.

As the second optical information recording medium, an optical disc such as, for example, MD (mini-disc) or MO (magneto-optic disc) can be used in addition to DVD, and as the third optical information recording medium, an optical disc such as, for example, CD-R or RW (write-once compact disc) can be used in addition to CD.

It is further preferable that focal length f of objective lens 23 for the light flux with wavelength λ1 is made to be in a range of 2.0 mm-4.0 mm. If the focal length f is greater than 4.0 mm, optical pickup device 20 is enlarged in terms of size in the direction of an optical axis, and if the focal length f is smaller than 2.0 mm, on the other hand, a working distance of the optical pickup device 20 becomes too short, resulting in a fear that the first optical information recording medium 10 in operation interferes with the objective lens 23.

It is further possible to arrange so that the spherical aberration correcting mechanism 30 corrects spherical aberration caused on light-converged spot P on each information recording surface by deviation of an oscillation wavelength from the design wavelength resulting from individual differences of light source 21, or to arrange so that the spherical aberration is corrected when an optical element which does not operate in the course of operation of the optical pickup device 20 among optical elements arranged in an optical path for a light flux with wavelength λ1, or light source 21 or both the optical element and the light source 21 are moved in the optical axis direction by a worker in the course of manufacturing the optical pickup device 20.

Third Embodiment

Next, the third embodiment of the invention will be explained as follows, referring to the drawings.

In the present embodiment, a main difference from the first embodiment mentioned above is that the spherical aberration correcting mechanism 30 is provided with liquid crystal element 31 and liquid crystal element drive circuit 32 which are arranged in the optical path for the light flux with wavelength λ1, and this difference will be explained mainly as follows.

Figure 9:
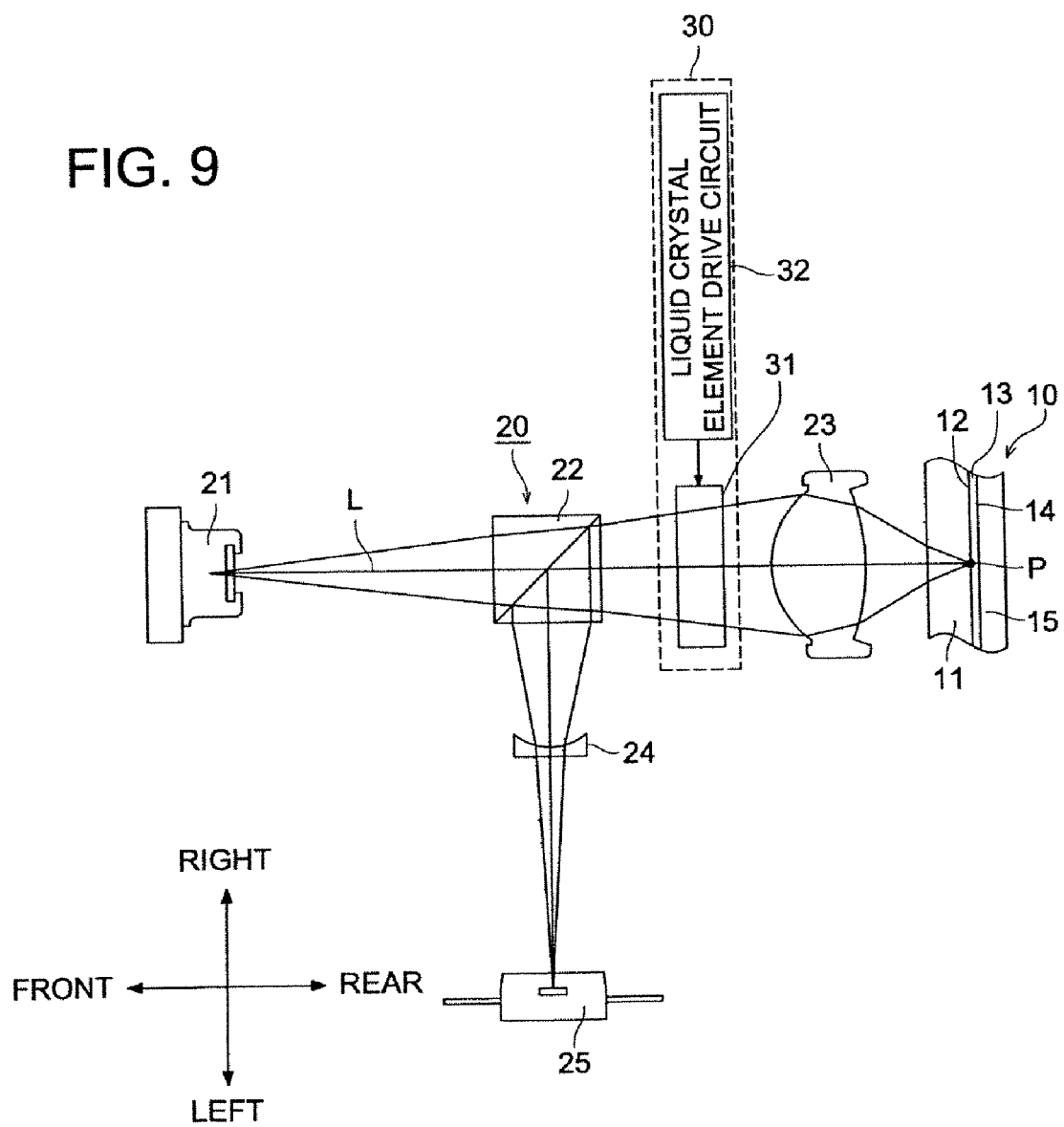
FIG. 9 is a top view showing the structure of an optical pickup device in the third embodiment.
Figure 10:
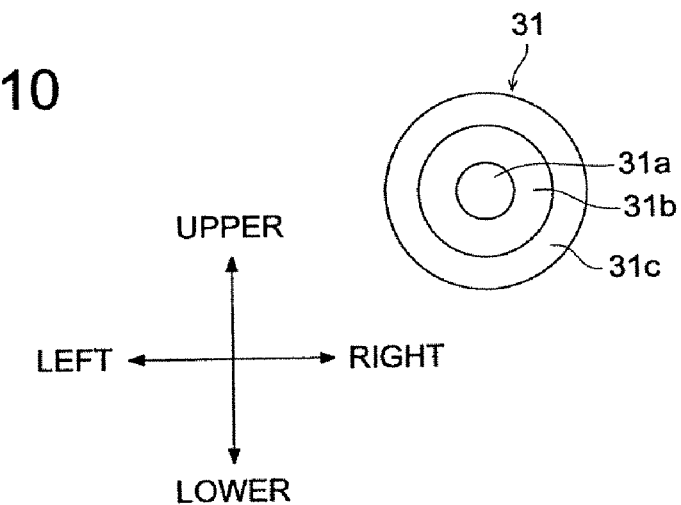
FIG. 10 is a front view showing the structure of a liquid crystal element.

As shown in FIG. 9 and FIG. 10, the liquid crystal element 31 is arranged in front of the objective lens 23, and is divided into plural (three in the present embodiment) areas 31a-31c which are in a form of concentric circles each having its center on the optical axis.

On each of the areas 31a-31c, there is formed a pattern of a transparent electrode that is made, for example, of indium-tin-oxide alloy. The liquid crystal element is in the structure wherein the refractive index of each of the areas 31a-31c is constant before voltage is impressed on the liquid crystal 31, and then, the refractive index of each of the areas 31a-31c can be changed by controlling an amount of voltage to be impressed on each of the areas 31a-31c with liquid crystal element drive circuit 32.

For example, when the light flux with wavelength λ1 is converged on the second information recording surface 14 under the condition that the light flux with wavelength λ1 is converged on the first information recording surface 12 without having no aberrations substantially and spherical aberration resulting from a thickness of intermittent layer 13 is caused on the second information recording surface 14, an unillustrated control section controls an amount of voltage to be impressed, by liquid crystal element drive circuit 32, on each of the areas 31a-31c of the liquid crystal element 31 based on output signals coming from photodetector 25, and changes the refractive index of each of the areas 31a-31c.

Due to this, an angle of incidence of the light flux with wavelength λ1 on the objective lens 23 is changed, and thereby, it is possible to modulate a wave front of the light flux with wavelength λ1 properly in each area, and to converge the light flux with wavelength λ1 on the second information recording surface 14 without having no aberrations substantially.

By adjusting voltage to be impressed on liquid crystal element 31 as stated above, it is possible to change distribution of refractive index of the liquid crystal element 31 and thereby to correct spherical aberration of the light-converged spot on the information recording surface on the side to conduct reproducing and/or recording of information to the level where there are no difficulties in practical use.

Fourth Embodiment

Next, the fourth embodiment of the invention will be explained as follows, referring to the drawings.

Figure 11:
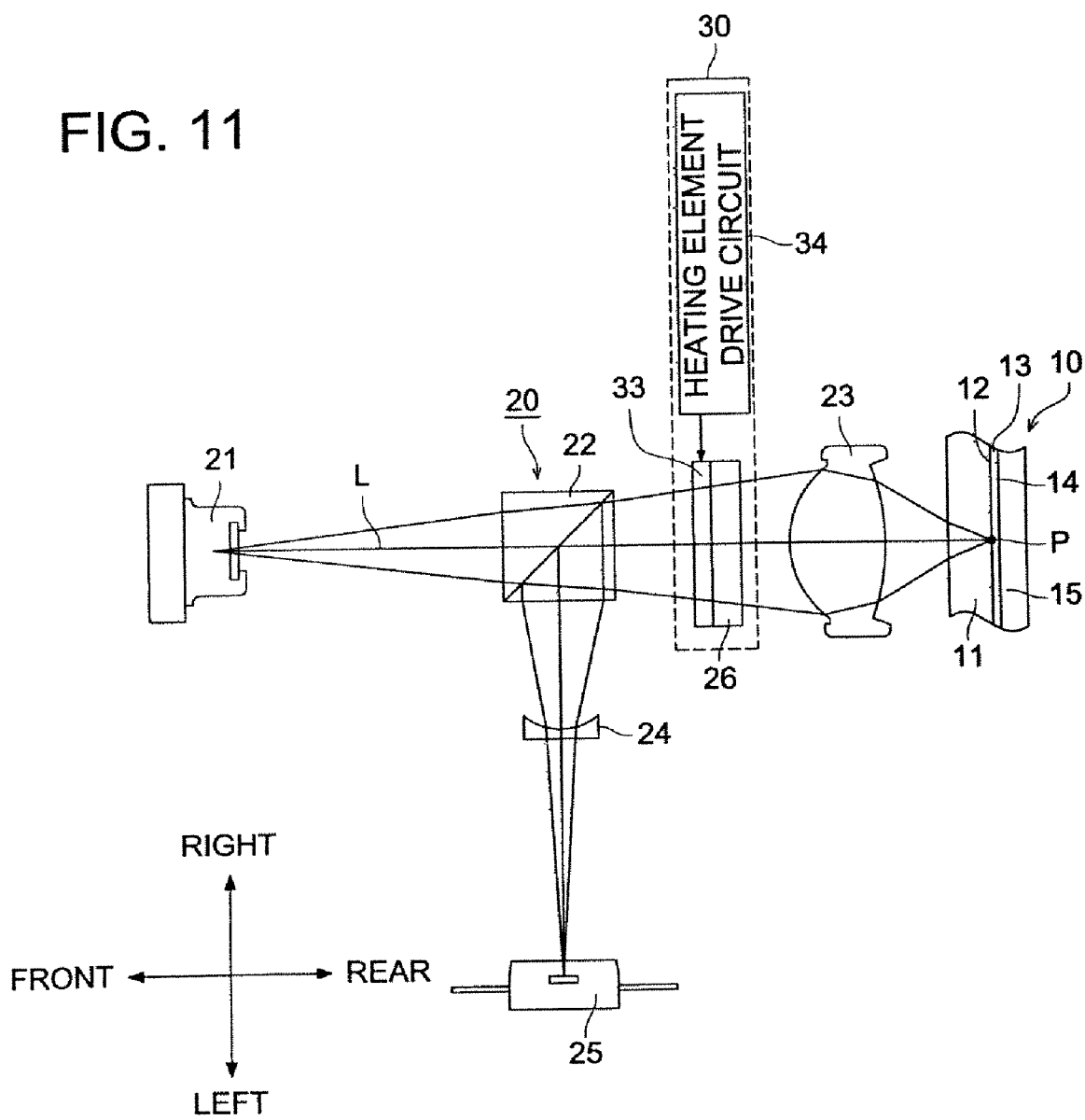
FIG. 11 is a top view showing the structure of an optical pickup device in the fourth embodiment.
Figure 12:
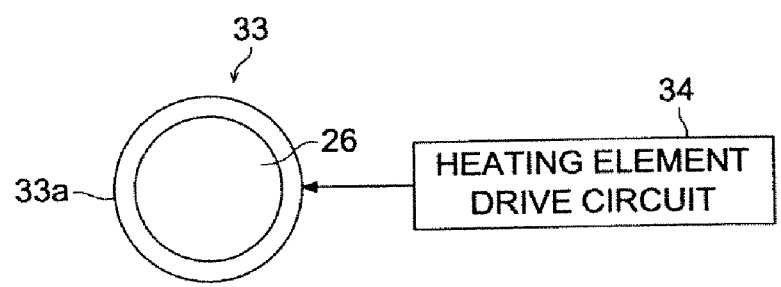
FIG. 12 is a front view showing a plastic lens and a heater.

As shown in FIG. 11 and FIG. 12, in the present embodiment, optical element 26 made of plastic (hereinafter referred to as "plastic lens") is arranged in the optical path for the light flux with wavelength λ1, and a main difference from the first embodiment mentioned above is that the spherical aberration correcting mechanism 30 is provided with heater 33 that changes temperature of the optical element and with heater drive circuit 34, and this difference will be explained mainly as follows.

As plastic lens 26, a plastic lens used generally as a lens constituting a light converging optical system of optical pickup device 20 such as, for example, a collimator lens, a coupling lens and objective lens 23 may be employed, or plastic lens 26 may be incorporated separately in a light converging optical system.

As shown in FIG. 12, a circumference of the plastic lens 26 is covered by dielectric coil 33a representing heater 33. In the structure, an unillustrated control section controls an amount of high-frequency voltage to be impressed on dielectric coil 33a by heater drive circuit 34 based on output signals coming from photodetector 25, and thereby, temperature of plastic lens 26 itself generated by heating of dielectric coil 33a can be adjusted, and changes of a form and refractive index of the plastic lens 26 caused by temperature changes can be adjusted.

For example, under the condition that a light flux with wavelength λ1 is converged on the first information recording surface 12 without having no aberration substantially, spherical aberration resulting from a thickness of intermittent layer 13 is caused on the second information recording surface 14 as stated above.

Then, when the heater drive circuit 34 controls an amount of voltage to be impressed on dielectric coil 33a in the case where the light flux with wavelength λ1 is made to be converged on the second information recording surface 14 without having aberrations substantially, temperature of the plastic lens 26 is changed and a form and refractive index of the plastic lens 26 are changed by its expansion. Therefore, a direction of advancement of the light flux with wavelength λ1 that has entered the plastic lens 26 is changed, and an angle of incidence on the objective lens 23 is also changed.

By adjusting a form of the plastic lens 26 as stated above, an angle of incidence of the light flux with wavelength λ1 on objective lens 23 can be changed as explained in the first embodiment.

Further, by adjusting refractive index of the plastic lens 26, a wave front of the light flux with wavelength λ1 passing through the plastic lens 26 can be modulated as explained in the second embodiment.

By adjusting an amount of voltage to be impressed on dielectric coil 33a as stated above, it is possible to change a form and refractive index of the plastic lens 26, and to correct spherical aberration of a light-converged spot on an information recording surface on the side for conducting reproducing and/or recording of information to the level where there are no difficulties in practical use.

Incidentally, though dielectric coil 33a is used as heater 33 in the present embodiment, it is also possible to use a well-known heater such as, for example, a heating wire, without being limited to the foregoing.

Effect of the Invention

The invention makes it possible to obtain an optical pickup device wherein NA is about 0.65, a thickness of a protective base board is about 0.6 mm and spherical aberration caused on a light-converged spot on each information recording surface by a thickness of an intermittent layer can be corrected even for high density optical disc having two information recording surfaces.

What is claimed is:

1. An optical pickup apparatus for conducting recording and/or reproducing information for a first optical information recording medium including at least a transparent protective substrate, a first information recording surface, and a second information recording surface which are laminated in this order from a light source side along an optical axis, comprising:

a first light source to emit a light flux having a wavelength of λ1 (380 nm≦λ1≦450 nm);

an objective lens to converge the light flux onto the first optical information recording medium;

a spherical aberration correcting structure to correct a spherical aberration caused in a converged spot on the first and second information recording surfaces due to a difference in thickness between the thickness from the surface of the transparent protective substrate to the first information recording surface and the thickness from the surface of the transparent protective substrate to the second information recording surface when the objective lens converges a light flux emitted from the first light source on the first information recording surface and the second information recording surface, wherein the objective lens is a single lens, wherein the spherical aberration correcting structure comprises optical elements including a positive lens and a negative lens, and wherein at least one of the optical element moves along the optical axis when the position of the converged spot of the light flux with a wavelength of λ1 is shifted from one of the first and second information recording surfaces to the other one.

2. The optical pickup apparatus of claim 1, wherein the first optical information recording medium further includes an intermediate layer between the first information recording surface and the second information recording surface.

3. The optical pickup apparatus of claim 1, wherein the thickness of the transparent protective substrate t1 is 0.2 mm or less.

4. The optical pickup apparatus of claim 1, wherein the thickness of the transparent protective substrate t1 is from 0.5 mm to 0.7 mm.

5. The optical pickup apparatus of claim 1, wherein the spherical aberration correcting structure changes an incident angle of a light flux with a wavelength of λ1 onto an objective lens when the position of the converged spot of the light flux with a wavelength of λ1 is shifted from one of the first and second information recording surfaces to the other one.

6. The optical pickup apparatus of claim 1, wherein the optical pickup apparatus comprises a plastic optical element which is arranged in an optical path of a light flux with a wavelength of λ1 and wherein the phase difference correcting structure changes a characteristics of the optical element by providing temperature fluctuation to the optical element.

7. The optical pickup apparatus of claim 1, wherein the spherical aberration correcting structure corrects a spherical aberration in a converged spot on the first and second information recording surfaces caused by an oscillated wavelength deviation from a designed wavelength of the light source due to an individual difference of light sources.

8. The optical pickup apparatus of claim 1, which the optical pickup apparatus conducts recording and/or reproducing information on a second optical information recording medium having a transparent protective substrate with a thickness of t2 (0.5 mm≦t2≦0.7 mm), using a second light source to emit a light flux with a wavelength of λ2 (650 nm≦λ2≦670 nm).

9. The optical pickup apparatus of claim 1, which the optical pickup apparatus conducts recording and/or reproducing information on a third optical information recording medium having a transparent protective substrate with a thickness of t3 (1.1 mm≦t3≦1.3 mm), using a third light source to emit a light flux with a wavelength of λ3 (750 nm≦λ3≦850 nm).

10. The optical pickup apparatus of claim 1, wherein a focal length f of the objective lens for the light flux with a wavelength of λ1 satisfies the following formula:

2.0 mm≦f≦4.0 mm.

11. The optical pickup apparatus of claim 1, wherein the optical pickup apparatus comprises a diaphragm to regulate the light flux, and the diaphragm is arranged on the optical information recording medium side from the top of the surface of the light source side of the objective lens.

* * * * *